United States Patent

[11] 3,617,539

| [72] | Inventors | James F. Grutsch<br>Hammond;<br>Russell C. Mallatt, Crown Point, both of Ind. |
|---|---|---|
| [21] | Appl. No. | 824,780 |
| [22] | Filed | May 15, 1969 |
| [45] | Patented | Nov. 2, 1971 |
| [73] | Assignee | Standard Oil Company<br>Chicago, Ill. |

[54] PROCESS FOR REMOVING CONTAMINANTS FROM WASTE-WATER
11 Claims, 1 Drawing Fig.

[52] U.S. Cl. .................................................. 210/13, 210/18, 210/53, 210/82, 210/195, 210/196, 210/221
[51] Int. Cl. ............................................................ C02c 5/06
[50] Field of Search ........................................... 210/3–8, 15, 18, 44, 51–54, 82, 195, 196, 221

[56] References Cited
UNITED STATES PATENTS

| 3,485,750 | 12/1969 | Albertson | 210/8 |
| 2,878,935 | 3/1959 | Magrath et al. | 210/82 X |
| 2,948,677 | 8/1960 | Austin et al. | 210/15 X |
| 3,171,804 | 3/1965 | Rice | 210/53 |
| 3,203,893 | 8/1965 | House et al. | 210/44 X |
| 3,236,766 | 2/1966 | Levin | 210/44 X |
| 3,301,779 | 1/1967 | Kovacs | 210/53 X |
| 3,423,309 | 1/1969 | Albertson | 210/18 X |
| 3,506,125 | 4/1970 | Willis et al. | 210/82 X |

OTHER REFERENCES
Rohlich, G. A., Application of Air Flotation to Refinery Waste Waters, Ind. and Eng. Chem. Vol. 46, No. 2, Feb. 1954, pp. 304– 308 (P.O.S.L.)
Ruchhoft, C. C. et al., Taste and Odor-Producing Components in Refinery Gravity Oil Separator Effluents, Ind. and Eng. Chem., Vol. 46, No. 2, Feb. 1954, pp. 284– 289 (P.O.S.L.)
Metcalf, L. et al., American Sewerage Practice, Vol. III, Dispose of Sewage, Third Edit., 1935, McGraw-Hill, N.Y., pp. 486– 489, and 593— 595 relied on (copy in G.P. 176)

*Primary Examiner*—Michael Rogers
*Attorneys*—Arthur G. Gilkes, William T. McClain and John J. Connors

ABSTRACT: Contaminants in waste-water are removed by passing the waste-water through a biological treating zone, adding a coagulating agent to the effluent from this treating zone to coagulate into solids contaminants remaining in said effluent, and then separating the solids from the water. Separation can be achieved by either air flotation and/or filtration. Preferably, the effluent from the biological treating zone contains unflocculated biological solids which reinforce the effect of the coagulating agent.

PATENTED NOV 2 1971
3,617,539
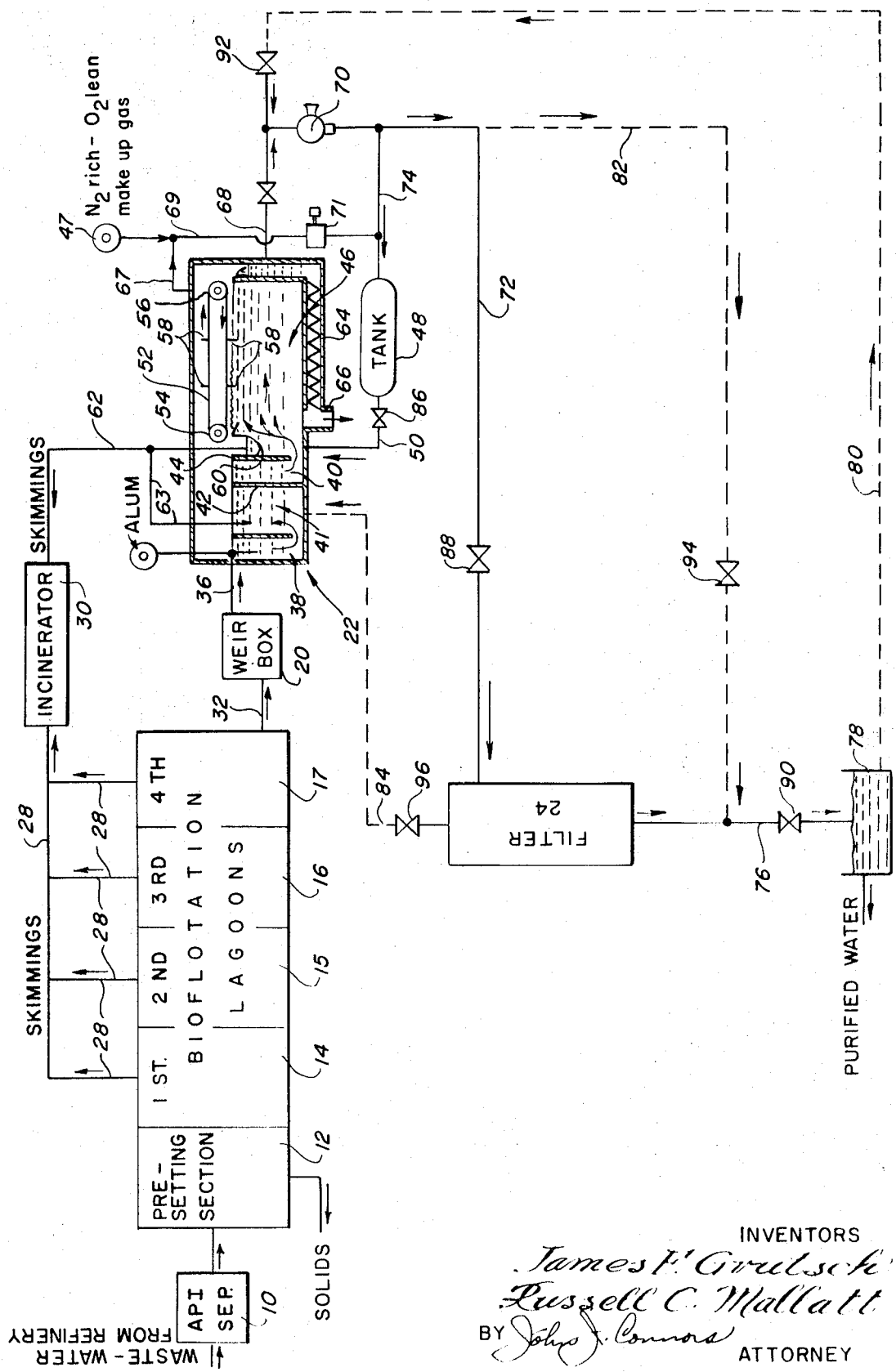
INVENTORS
James F. Grutsch
Russell C. Mallatt
BY John J. Connors
ATTORNEY

PROCESS FOR REMOVING CONTAMINANTS FROM WASTE-WATER

BACKGROUND OF THE INVENTION

The need to reduce water pollution is well known. Contaminated waste-water must be purified to a high degree before it is discharged into rivers and lakes, particularly those receiving waters which are part of critical watersheds. Presently, most purification processes rely, at least in part, on aquatic micro-organisms to cleanse waste-water of organic and inorganic pollutants. These organisms breathe oxygen, eat pollutants, grow, reproduce, and die. As this life cycle proceeds, a biologically active sludge forms which occludes pollutants. This sludge may be buoyant or it may be heavy and sink, depending upon the nature of the contaminated waste-water.

In the well-known activated sludge process, organisms and contaminated water are mixed and aerated in a reactor, and then some of the mix is withdrawn to a clarifier. In the clarifier, the biologically active sludge separates from purified water. Some of this sludge is recycled to the reactor to increase or maintain the concentration of organisms in the reactor, and excess sludge is removed from the system and disposed of by various means. Air under pressure may be bubbled through the mix in the reactor, the bubbling air dispersing the sludge and supplying oxygen to the micro-organisms for biochemical oxidation.

The activated sludge process, however, cannot treat directly waste-water from an oil refinery. Before this waste-water is fed to the activated sludge reactor, the oil pollutant in the water must be reduced to levels the micro-organisms can tolerate, otherwise the oil will interfere with the process. By adding coagulating chemicals such as alum to the waste-water, oil and other colloidally dispersed contaminants coagulate into solids which are flocculated and then physically separated from the water. In addition to the removal of oil, phosphates—required nutrients for the micro-organisms—are also removed. Consequently, the phosphates must be reintroduced into the activated sludge reactor to optimize the biological activity of the sludge. In addition to this costly drawback, the activated sludge reactors require a large capital investment, and they are expensive to operate and maintain. Moreover, the phosphate added as a nutrient must later be removed from the effluent, further contributing to operational cost.

DESCRIPTION OF THE INVENTION

General

We have discovered that substantially improved waste-water purification is achieved by first passing the waste-water through a biological treating zone, and then adding a coagulating agent to the effluent from this treating zone to coagulate into solids contaminants remaining in the effluent. Quite unexpectedly, relatively little coagulating agent is needed to remove the contaminants in the effluent. If the coagulating agent is added to the waste-water before the waste-water is passed through the biological treating zone, which is the prior art practice, the same high degree of water purification is not attained. Not only is the water clarified by destabilizing colloidal contaminants, permitting their flocculation to a size removable in a clarifier, filter, etc., but surprisingly, the addition of the coagulating agent subsequent to biological treatment reduces soluble contaminants to an unforeseen degree. This is unexpected because coagulating agents normally have little effect on soluble contaminants.

We believe the presence of peptized or unflocculated biological solids in the effluent from the biological treating zone is responsible for the improved contaminant removal. These peptized biological solids are substantially unflocculated, that is, they are individual or small clusters of individual aquatic micro-organisms dispersed in the water being treated. In contrast, flocculated biological solids are large aggregates of micro-organisms encapsulated in a polysaccharide slime. These flocculated biological solids are more readily removed from water than the unflocculated biological solids. The particle size of the unflocculated solids may be as small as about one micron for single cell members of the micro-organism population such as bacteria, algae and protozoa, or larger for multicellular members such as rotifers, crustaceans and fungi. These unflocculated biological solids have a much larger surface area per unit of mass than the flocculated solids, and apparently this massive surface area provides maximum adsorption and absorption of biological oxygen demand (BOD) contaminants, chemical oxygen demand (COD) contaminants, phenolics, and other taste and odor-producing contaminants both in the soluble and colloidal states. Upon coagulation and flocculation, soluble and colloidal contaminants are probably enmeshed and caught in the flocs and removed. But regardless of the mechanism, chemical coagulation in the presence of unflocculated biological solids yields water of exceptionally high purity. This is illustrated by the following table showing forecasted treatment levels based on pilot plant studies, generally valid for most oil refinery waste-water:

TABLE.—CONCENTRATIONS IN PARTS PER MILLION

|  | Typical refinery waste-water after primary treatment | Typical effluent from biological treating zone | Typical water |
|---|---|---|---|
| Immediate Oxygen Demand (IOD), API Method No. 729-56 | 0-100 | 0 | 0 |
| Biochemical Oxygen Demand (BOD), API Method No. 727-53 | 100-300 | 20-50 | 0-4 |
| Chemical Oxygen Demand (COD), API Method No. 728-58 | 200-1,200 | 100-200 | 10-40 |
| Oil content, API Method No. 733-58 | 50-300 | 30-50 | 0-4 |
| Suspended solids, API Method No. 709-53 | 20-150 | 20-60 | 0-4 |
| Phenolics, API Method No. 716-57 | 1-10 | .2-1 | 0-.4 |
| Phosphate, APHA Standard Method | 2-6 | 2-6 | 0-.4 |
| Threshold odor number, API Method No. 721-58 | 1,000-50,000 | 500-5,000 | 0-50 |

The above table exemplifies at least two outstanding accomplishments of our process. First, threshold odor number is reduced by 90+ percent. Odor-producing contaminants in the effluent from the biological treating zone are particularly refractory. Activated carbon has been used as a means of reducing these contaminants, but it has been found to be of little value. According to our process, most odor-producing contaminants are removed. Second, phosphates are reduced by 90 percent. Phosphates in low concentrations, that is below about 10 p.p.m., are exceedingly difficult to remove. This problem is discussed in the SUMMARY REPORT, Advanced Waste Treatment, July 1964 to July 1967, pages 65-68, published by the U.S. Department of Interior, Federal Water Pollution Control Administration, Publication WP-20-AWTR-19.

Conventional processes use a great deal more coagulating agent than our process to reduce the phosphates to the same level reached using our process. Surprisingly, according to our process, generally the more biological solids present, the less coagulating agent needed. For example, we have found that to accomplish the reduction in phosphate shown in the table, about 25 p.p.m. of the coagulating agent, alum, is required to purify water containing 50–60 p.p.m. biological solids, whereas about 50 p.p.m. of the alum is required to purify water containing only 20–30 p.p.m. of biological solids. In most instances, from 5–100 p.p.m. of a coagulating agent, preferably 10–50 p.p.m., is adequate, and 25 p.p.m. is typical. Normally the effluent from the biological treating zone contains from about 10 to about 100 p.p.m. of biological solids. These biological solids are substantially unflocculated, although some flocculated biological solids may also be present.

Biological Treating Zone

The biological treating zone preferably is in accordance with the process disclosed in our U.S. Pat. No. 2,948,677, or the improvements disclosed in our patent application entitled, "WATER PURIFICATION SYSTEM (I)," Ser. No. 824,858, assigned to Standard Oil Company (Indiana), and the application of Grutsch and Flood, also assigned to Standard Oil Company (Indiana), and entitled, "WATER PURIFICATION SYSTEM (II)," Ser. No. 824,781. Both of the above-mentioned applications are filed concurrently with this application. In these processes, waste-water passes through a series of lagoons in which thrive aquatic micro-organisms that feed on the pollutant in the water. Air is physically beaten into the water's surface to promote the growth of aerobic micro-organisms. The micro-organisms produce a sludge and air bubbles buoy up this sludge so that it floats on the lagoon surfaces. Preferably, floating booms, stretching across the lagoons transverse to the direction of the water flow, confine this floating sludge to the upstream ends of the lagoons; and rotating drum skimmers along these booms skim off the sludge. Collected sludge is then dewatered and fed to an incinerator. Floating, rotary aerators equipped with downwardly extending baffles float on the lagoons' surfaces and churn up surface water, moving it in a horizontal direction. The baffles direct some of this churning surface water towards the lagoons' bottoms to scour the bottoms and prevent the accumulation of sludge. The waste-water is desirably retained in each lagoon for a period ranging from about 2 to about 6 hours, total retention time in the series of the lagoons ranging from about 12 to about 72 hours. Retention time will depend upon the refractory nature of the waste-water, the aeration supplied, and the activity of the micro-organisms. Such a biological treating zone can tolerate shock loadings of toxic and acidic materials, consistently make excellent reduction in contaminants, and the effluent from such a zone includes usually 30–60 p.p.m. of suspended, chiefly unflocculated, biological solids.

Coagulating and Flocculating Agents

As the water leaves the biological treating zone, i.e., the last of the lagoons, it flows into a mixing zone where the coagulating agent is added. The preferred coagulating agent is alum, $Al_2(SO_4)_3\cdot 14\,H_2O$. Other suitable coagulating agents are, for example, sodium aluminate, $NaAlO_2$; ferrous sulfate (copperas), $FeSO_4$; ferric chloride, $FeCl_3$; and/or lime, $Ca(OH)_2$. As previously mentioned, the amount of coagulating agent needed will usually range from about 5 to about 100 p.p.m. Many contaminants in the effluent from the last of the biological lagoons are held in suspension by electrostatic forces which tend to keep the contaminate peptized. The addition of the coagulating agent to the suspension unstabilizes the system. Preferably, the addition of this agent is accompanied by rapid mixing to create a zone of high turbulence. This turbulence assures good dispersion of the coagulating agent and increases the opportunity for particle-to-particle contact. A flocculating agent which promotes the growth of the coagulated particles may be added subsequent to the addition of the coagulating agent. This flocculating agent, a polyelectrolyte, is substantially a straight chain polymer including such polar groups as an amide, an amine, or carboxylic acid. Generally the molecular weight of this polymer is from about 500,000 to about 3,000,000 and the ratio of flocculating agent to coagulating agent ranges between about 0.01 and about 0.002. Examples of suitable flocculating agents are: Genfloc 155 and 156, Nalco 2185, Purifloc A-21 and A-22, Separan 2610, Polyhall 295, Zimmie 600 and Primafloc C-7.

Separation of Solids

The solids formed with the addition of the coagulating agent, or coagulating and flocculating agents, can be separated from the water by various methods, for example, gas flotation or filtration. In the gas flotation process, air or another gas is injected into the water to buoy up the coagulated solids so that these solids float. Then these buoyant solids are skimmed from the water's surface. In the filtration process, the water-solid mix is simply passed through a filter which entraps the solids and permits the water to pass through. Gas flotation offers the advantages of equipment simplicity and recovery of the solids in thickened form so that expensive and difficult solids dewatering operations are avoided. Filtration offers the advantages of superb effluent water clarity with maximum efficiency of coagulating chemical usage. With a high solids loading (e.g. 60+ p.p.m. suspended solids), however, the filter has the disadvantage of requiring frequent backwashing for regeneration. The volume of backwash water may amount to about 10 percent of the filter throughput—a very considerable volume. In such cases, expensive ancillary facilities, such as a thickener followed by a vacuum or pressure filter, are required for handling and dewatering the backwash solids prior to final disposal. Conventionally, to reduce frequency of filter backwashing, a water high in solids is subjected to sedimentation to remove gross quantities of solids and reduce the load on the filter. This only reduces frequency of backwashing and the filter surface area required, but ancillary facilities for handling the backwash water and dewatering the solids are still required.

We have found that by combining the gas flotation and filtration processes not only are solids more efficiently separated from the water, but also a convenient and inexpensive method of backwashing the filter is facilitated. Moreover, as is discussed below, this new separating technique surprisingly results in a system effective for biological denitrification and desulfurization. Normally, the solids reaching the filters are peptized, resisting phase separation during gas flotation treatment. This property is changed dramatically during the period of residence in the filter, possibly because the character of the prevailing microbial population changes. When backwashed, the solids are recycled directly to the flocculation zone, where they readily flocculate. The flocculation/gas flotation combination can handle these surges due to backwash with only a minor deterioration in performance. This hydraulic stability is not available with a fully loaded gravity clarifier system, where the deterioration in performance is substantial.

An important advantage of the gas flotation/filter combination is that the solids are removed by the gas flotation process in a dewatered state ready for incineration. In the treatment of refinery waste-water, for example, we find that the material removed by gas flotation has a heat content of 2,100 BTU/lb. and the following composition: 85 percent water, 10 percent oil, and 5 percent solids. This material can be fluxed with oily primary and secondary sludges to yield an incinerator feed of 2,500–3,000 BTU/lb., a heat content sufficient for self-sustaining combustion. By contrast, the sedimentation route yields dilute sludges containing 90–90 percent water that require a clarifier-thickener operation which reduces the water content to 92–95 percent. This is still too much water for economical incineration and further dewatering by a vacuum or pressure filter is required.

Denitrification and Desulfurization

A further and unique aspect of our invention is that the micro-organism population developed in the gas flotation/filtration section of our system is very effective in denitrification and desulfurization without resorting to the conventional practice of adding methanol as a food supply. The micro-organisms responsible for denitrifying and desulfurizing possible are utilizing biological cell tissue or biological intermediates as food material. In conventional denitrification and desulfurization processes calling for adding methanol to the water, excessive odor contaminants are carried out with the effluent. This is not the case with our system. In our desulfurizing process, both elemental sulfur and hydrogen sulfide were observed as products. The elemental sulfur is flocculated and removed with the sludge in the gas flotation zone and the hydrogen sulfide is air stripped by the flotation gas or oxidized to sulfur and removed with the sludge. Thus, the effluent from our system is substantially free of musty odors.

In some instances, the capacity of the gas flotation/filtration system for denitrification and desulfurizing may be greatly increased by simply recycling a portion of the flotation solids to the flocculator. Such recycling enables one to control the concentration of denitrifying and desulfurizing micro-organisms in the flocculator. Of course, the denitrifying and desulfurizing reactions occur mainly in the flocculator under this mode of operation. If it becomes advantageous to reduce the availability of oxygen, the system can be easily enclosed and recycled nitrogen used for flotation rather than air. The limited solubility of nitrogen in water keeps nitrogen consumption low.

DESCRIPTION OF THE PREFERRED EMBODIMENT

The FIGURE, which is a schematic drawing of our process, shows contaminated waste-water from an oil refinery sequentially passing through an American Petroleum Institute (API) separator 10, presettler pond 12, four bioflotation lagoons 14–17, weir box 20, coagulator-air-flotation unit 22, and finally through filter 24. API separator 10 removes gross amounts of surface oil from the waste-water, and in the presettler pond 12 some solid particles settle out. Next, the waste-water passes through lagoons 14–17, and a row of aerators (not shown) at the upstream end of each lagoon beat air into the lagoons' surfaces. Aerobic micro-organisms in lagoons 14–17 eat pollutants and form sludge which occludes contaminants, and the myriad of air bubbles beaten into the water buoy up the sludge so that it floats. This is described in greater detail in U.S. Pat. No. 2,948,677. Booms (not shown) down stream from each row of aerators stretch across lagoons 14–17 and confine the floating sludge to the upstream ends of the lagoons. Rotating drums (not shown), such as those manufactured by the Rex Chainbelt Corporation of Milwaukee, Wisconsin, skim off this floating sludge as it is carried by the currents in the lagoons towards the booms and drums. The details of the boom-skimmer arrangement are disclosed in the application entitled, "WATER PURIFICATION SYSTEM (II)." Collected sludge is then fed via lines 28 into incinerator 30. Preferably this sludge is dewatered before it passes to incinerator 30.

We have found it advisable to stir lagoons 14–17 and aerate the lower as well as upper stratas of these lagoons. Stirring and aerating are best achieved by mounting downwardly extending baffles (not shown) to conventional floating rotary aerators (not shown), such as mammoth rotors sold by the Beloit-Passavant Corporation of Janesville, Wisconsin. The rotary aerators churn up surface water and impart a horizontal velocity vector to the churning surface water. The baffles direct at least some of this churning water downwardly towards the lagoons' bottoms, and this downwardly directed churning water stirs up the lagoons and scours the lagoons' bottoms to prevent accumulation of sludge. Details of this stirring-aeration apparatus are disclosed in the application entitled, "WATER PURIFICATION SYSTEM (I)."

The effluent from the last bioflotation lagoon 17, containing unflocculated biological solids, flows via line 32 through weir box 20 and line 36 into coagulator-air-flotation unit 22; and the effluent from unit 22 flows through filter 24. First water flows into mixing section 38 in unit 22 where the coagulating agent, such as alum, is added and flash mixed with the water. With the addition of the coagulating agent, colloidal particles start to agglomerate and are carried into the flocculating section 41, then through channel 40 defined by partitions 42 and 44 into flotation section 46. The retention time in mixing section 38 should be long enough to insure adequate coagulation. This usually is about 0.5–2 minutes. The retention time in flocculation section 41 is about 10–20 minutes.

In flotation section 46, compressed gas (90 volume percent or greater $N_2$ from source 47) and water are mixed in tank 48 and injected via valved line 50 into the flocculated solid-water mix. The gas separates rapidly from solution, forming tiny bubbles which attach themselves to the flocculated solids, and carry these solids up to the surface of the water. Skimming belt 52, drawn over driver rollers 54 and 56, moves in a clockwise direction against the water currents in section 46. Blades 58, attached to belt 52 and lying transverse to the direction of waterflow, sequentially dip into the surface of the water as the flights of the belt move along their course. These blades 58 push floating solids towards hopper 60 located at the upper end of section 46. As solids accumulate in hopper 60, the bulk of them are removed via line 62 and fed into incinerator 30. Some are however recycled via line 63 to flocculating section 41. Sludge and solids which build up on the bottom of section 46 are removed via screw 64 and drain 66, and gas is recycled via lines 67 and 69, and compressor 71. The effluent from unit 22 flows via valved line 68 into pump 70 which feeds this effluent via valved line 72 through filter 24 and recycles a portion of this effluent back into unit 22 via line 74, air tank 48, and valved line 50.

Filter 24 may use sand as a filter material, but the preferred material is a mixed media filter such as one sold by Neptune Microfloc, Inc. of Corvallis, Oregon. This mixed media filter is a series of contiguous beds containing granular particles of different material, coarseness and density. During filtration, the water first filters through the coarser particles, flowing from the top of filter 24 and out the filter's bottom through valved line 76 into backwash storage tank 78. The overflow from backwash storage tank 78 is purified water.

Most solids are removed in unit 22, but some solids amounting to about 5–10 p.p.m. manage to escape with the effluent from unit 22. Most of these solids are entrapped in filter 24. Eventually filter 24 becomes clogged, and the entrapped solids must be removed. To achieve this, water stored in backwash storage tank 78 is recycled along the course shown in dotted lines. Namely, through valved line 80 into pump 70, then through valved line 82 and filter 24 counter to the direction of waterflow during filtration, and finally out of the top of filter 24 via valved line 84 into flocculating section 41. With backwashing, valves 88 and 90 are closed, and valves 92, 94 and 96 are open. The counterflowing backwash water flushes entrapped particles out of filter 24, and these particles are carried with the backwash water into flocculation section 41, where they are flocculated further and passed to the flotation section 46, where they are removed from the water by air flotation and skimming, and then fed to incinerator 30.

Filtering the effluent from unit 22 is desirable, but not absolutely necessary, since this effluent is sufficiently pure to meet most present-day requirements. However, by filtering and then flushing backwash water into flocculating section 41, a desulfurizing and denitrifying microbiological population evolves. These organisms collect in filter 24 or unit 22, or both. In some instances it may be desirable to concentrate these organisms in flocculating section 41 and promote their growth. This is best achieved by employing gastight, enclosed unit 22, using the nitrogen rich gas for flotation, recycling this gas, and recycling some skimmings to flocculating section 41. These are, however, optional features of our invention.

We have found that the addition of coagulating agent to the effluent from the biological treating zone provides other outstanding advantages in addition to reduction of threshold odor number and removal of phosphates, nitrates, and sulfates. Namely, compared to the activated sludge process, our process requires less capital investment, it costs less to operate and maintain, and it is particularly adapted to treat refinery waste-waters. Moreover, by feeding the backwash stream into the flotation unit, a substantial savings in processing and water handling equipment is realized. For example, our process does not require a clarifier, tube settler, or an anaerobic digester.

We claim:

1. A process for removing contaminants from waste-water, comprising the steps of:
   a. passing the waste-water through a series of bioflotation lagoons so that the effluent from the last of said lagoons has suspended therein substantially unflocculated, biological solids present in amounts ranging from about 10 to about 100 parts per million;
   b. passing the effluent from the ;ast of said lagoons into a mixing-flocculation zone and adding coagulating agent to said effluent to coagulate said biological solids and other contaminants in the waste-water;
   c. injecting gas into the coagulated and flocculated solid-water mix while said mix is contained within a gas flotation zone, whereby the solids are buoyed up so that they float on the water's surface;
   d. skimming the floating solids from the water's surface;
   e. withdrawing water from the flotation zone and passing said withdrawn water through a filter to remove solids that were not removed during skimming;
   f. periodically backwashing the filter with water to remove solids entrapped in said filter; and
   g. returning the water used to backwash the filter to the mixing-flocculation zone, whereby solids collected in the filter and washed therefrom during backwashing are flocculated, fed into the gas flotation zone, buoyed up, and skimmed off the water's surface.

2. The process defined in claim 1 wherein a portion of the solids removed by skimming are recycled to the mixing-flocculation zone.

3. The process defined in claim 1 wherein the gas used comprises 90 volume percent or more nitrogen.

4. A process for removing contaminants from waste-water, comprising the sequential steps of
   a. passing the waste-water through a series of aerated bioflotation lagoons collecting and removing floating sludge from the surface of at least some of the lagoons wherein the effluent from said series of lagoons includes about 0.2–1 p.p.m. phenolics and about 2–6 p.p.m. phosphates and has suspended therein substantially unflocculated biological solids present in amounts ranging from about 10 to about 100 p.p.m.,
   b. adding to said effluent from about 5 to about 100 p.p.m. of a coagulating agent to coagulate said biological solids and other effluent contaminants and substantially reduce the phenolics and phosphates in the waste-water; and
   c. separating the coagulated solids from the water and drawing off substantially purified water.

5. The process of claim 4 wherein the coagulated solids are separated from the water by passing the water-solids mix through a filter which entraps the solids and permits the water to pass therethrough.

6. The process of claim 4 wherein the coagulated solids are separated from the water by: (a) injecting gas into the water to buoy up the solids so that said solids float, and (b) skimming the buoyant solids from the water's surface.

7. The process of claim 4 wherein the coagulating agent is alum, sodium aluminate, ferrous sulfate, ferric chloride, lime, or mixtures thereof.

8. The process of claim 4 wherein a flocculating agent is added subsequent to the addition of the coagulating agent.

9. A process for removing nitrogen and sulfur contaminants from waste-water, comprising
   a. adding a coagulating agent to the waste-water and passing the waste-water through a flocculating and flotation zone; separating coagulated solids from the water by injecting gas into the water to buoy up the solids so that said solids float, and then skimming said buoyant solids from the surface;
   b. evolving and collecting micro-organisms which remove nitrogen and sulfur contaminants from the water by passing water treated according to step (a) through a filter media to remove solids not removed in step (a), whereby said micro-organisms responsible for denitrifying and desulfurizing collect on the filter media;
   c. periodically backwashing the filter media with water to flush out entrapped solids from the media and feeding the water used in said backwashing into said flocculating and flotation zone to introduce the denitrifying and desulfurizing micro-organisms into the flocculating and flotation zone.

10. The process of claim 9 wherein gas used is rich in nitrogen.

11. The process of claim 10 wherein the flocculation and flotation zone is enclosed and the nitrogen-rich gas is recycled through this enclosed zone.

* * * * *